US007865633B2

(12) United States Patent
Wilkinson

(10) Patent No.: US 7,865,633 B2
(45) Date of Patent: Jan. 4, 2011

(54) MULTIPLE CONTEXT SINGLE LOGIC VIRTUAL HOST CHANNEL ADAPTER

(75) Inventor: Keith Iain Wilkinson, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 162 days.

(21) Appl. No.: 11/469,454

(22) Filed: Aug. 31, 2006

(65) Prior Publication Data

US 2008/0123672 A1 May 29, 2008

(51) Int. Cl.
*G06F 13/00* (2006.01)
(52) U.S. Cl. .................. 710/33; 709/201; 709/203; 709/220; 709/221; 709/222; 709/223; 709/224; 709/225; 709/226; 709/229; 710/62; 710/243
(58) Field of Classification Search .............. 710/62, 710/243; 709/203, 223, 250, 201, 220, 221, 709/222, 224, 225, 226, 229, 238; 370/360, 370/412, 466
See application file for complete search history.

(56) References Cited

U.S. PATENT DOCUMENTS

| | | | |
|---|---|---|---|
| 6,233,243 B1 * | 5/2001 | Ganmukhi et al. .......... 370/412 |
| 6,980,552 B1 | 12/2005 | Belz et al. | |
| 7,010,633 B2 | 3/2006 | Arndt et al. | |
| 7,095,750 B2 | 8/2006 | Craddock et al. | |
| 7,194,538 B1 * | 3/2007 | Rabe et al. ................. 709/224 |
| 7,673,168 B2 * | 3/2010 | Matsuda ....................... 714/4 |
| 2002/0046291 A1 | 4/2002 | O'Callaghan et al. | |
| 2002/0172195 A1 * | 11/2002 | Pekkala et al. ............. 370/360 |
| 2003/0145045 A1 | 7/2003 | Pellegrino et al. | |
| 2004/0030763 A1 | 2/2004 | Manter et al. | |
| 2004/0225810 A1 | 11/2004 | Hiratsuka | |
| 2005/0235092 A1 * | 10/2005 | Ballew et al. ............... 710/316 |
| 2006/0013253 A1 | 1/2006 | Hufferd | |
| 2006/0230185 A1 | 10/2006 | Errickson et al. | |
| 2007/0005908 A1 | 1/2007 | Lakshmanamurthy et al. | |
| 2007/0143546 A1 | 6/2007 | Narad | |
| 2008/0126507 A1 | 5/2008 | Wilkinson | |
| 2008/0126564 A1 | 5/2008 | Wilkinson | |

* cited by examiner

*Primary Examiner*—Tariq Hafiz
*Assistant Examiner*—Jasjit S Vidwan
(74) *Attorney, Agent, or Firm*—Schwegman, Lundberg & Woessner, P.A.

(57) ABSTRACT

Various embodiments provide methods and systems operable to receive a work queue pair from the host application, to add the work queue pair to a scheduler queue for a virtual HCA scheduler, to update a context associated with the work queue pair, to create at least one data packet corresponding to the work queue pair, and to send the at least one data packet to at least one of a plurality of target nodes via at least one of a plurality of data channel ports.

21 Claims, 18 Drawing Sheets

MULTIPLE CONTEXT SINGLE LOGIC VIRTUAL HOST CHANNEL ADAPTER

TECHNICAL FIELD

The disclosed subject matter relates to the field of computer network communications, and more particularly to network host channel adapters.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006 Cisco Systems, Inc. All Rights Reserved.

BACKGROUND

Conventional network hardware and software may be used to support data transfers between an originating host network node and a destination target network node over one or more designated data channels. The host network node may represent a host system/host processor/host server (denoted host) on which a variety of applications or services are provided. The host typically connects to the network via a dedicated hardware network interface adapter, which is typically referred to as a host channel adapter (HCA). The host channel adapter (HCA) may be used to provide an interface between the host network node and the switched network via high speed data links. Similarly, destination target channel adapters (TCA) may be used to provide an interface between the multi-stage switched network and an I/O controller (e.g., storage and networking devices) of either a second network or a target I/O unit via high speed data links.

Conventional HCA-based systems typically dedicate one HCA for each host node data channel. In most cases, the HCA is resident in the host system. Although it would be beneficial to aggregate multiple HCA devices in a single system separate from the host, the hardware requirements for such a multi channel HCA system would be substantial. In fact, it would be extremely difficult to embody a useful quantity of multiple HCA devices on a single logic device using current semiconductor technology.

Thus, a multiple context single logic virtual host channel adapter is needed.

DETAILED DESCRIPTION

Figure 1:
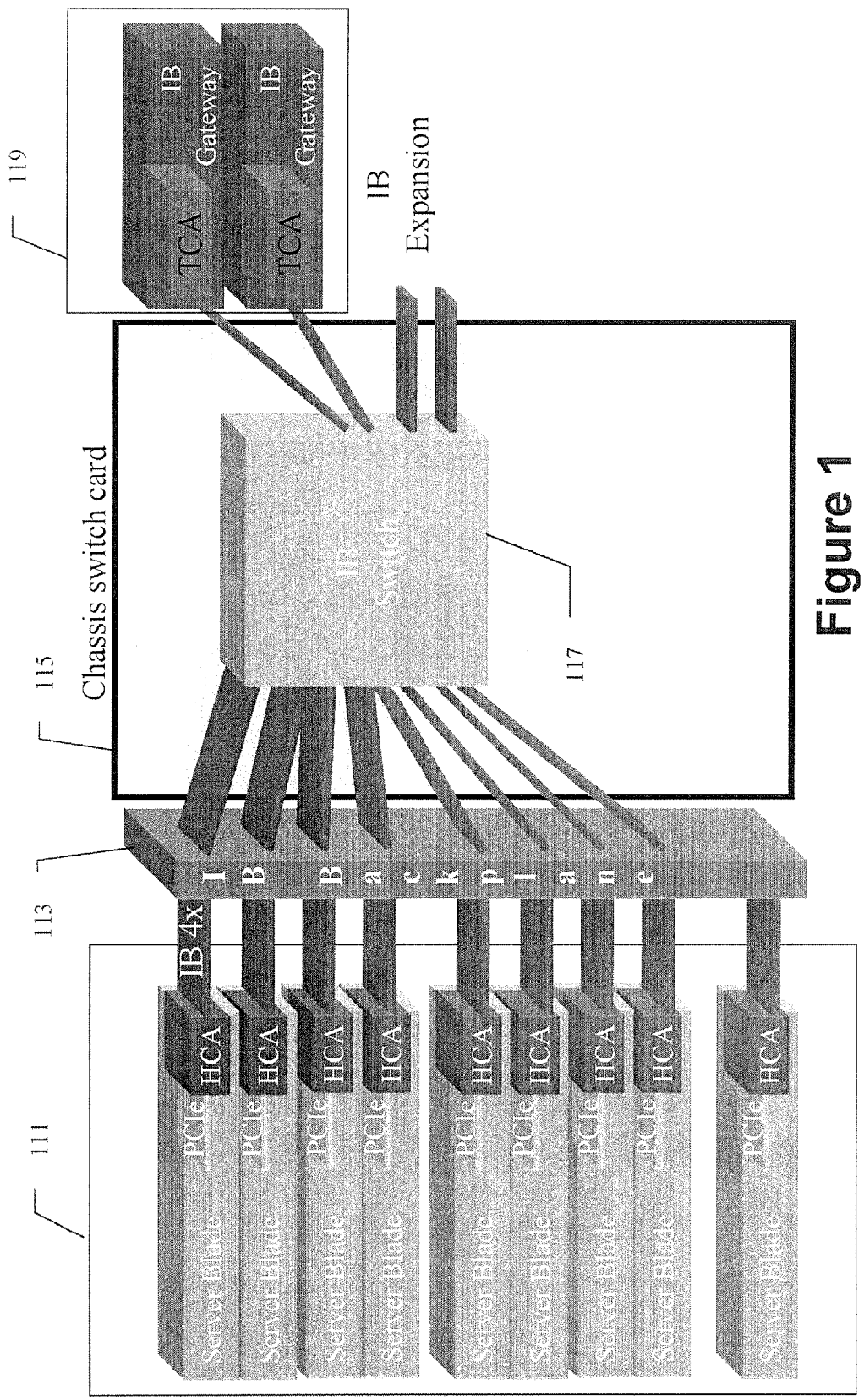
FIG. 1 illustrates a conventional InfiniBand network architecture.

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a multiple context single logic virtual host channel adapter to enable data communication in a switched data network.

A data network in various embodiments generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) busses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices via the data network. Recently, the PCI Extended (PCI-X) and PCI Express networking technology has emerged. PCI Express is a new third-generation input/output (I/O) standard allowing enhanced Ethernet network performance beyond that of the older PCI and PCI-X desktop and server networking solutions. The higher performance of PCI Express derives from its faster, serial-bus architecture, which provides dedicated bi-directional I/O with 2.5 GHz clocking, versus the slower 133 MHz parallel bus of PCI-X. PCI Express technology is described in a white paper entitled, "PCI Express Ethernet Networking", published by Intel Corp. and dated September, 2005.

Other conventional data network architectures include InfiniBand™ and its predecessor, Next Generation I/O (NGIO) which have been developed by Intel Corp. and other companies to provide a standards-based I/O platform that uses a switched network and separate I/O channels instead of a shared memory-mapped bus architecture for reliable data transfers between end-nodes in a data network, as set forth in the "*Next Generation Input/Output (NGIO) Specification,*" NGIO Forum on Jul. 20, 1999 and the "*InfiniBand™ Architecture Specification,*" (IB network) the InfiniBand™ Trade Association on Oct. 24, 2000. Using NGIO/InfiniBand™, a host system may communicate with one or more remote systems using a Virtual Interface (VI) architecture in compliance with the "*Virtual Interface (VI) Architecture Specification,* Version 1.0," as set forth by Compaq Corp., Intel Corp., and Microsoft Corp., on Dec. 16, 1997. NGIO/InfiniBand™ and VI hardware and software may often be used to support data transfers between an originating host network node and a destination target network node over one or more designated channels.

The host network node may represent a host system/host processor/host server (denoted host) on which a variety of applications or services are provided. The host connects to the network (e.g. an IB network) via a network interface adapter, which is referred to in IB parlance as a host channel adapter (HCA). The host channel adapter (HCA) may be used to provide an interface between a memory controller (not shown) of the host and the switched network via high speed NGIO/InfiniBand links. Similarly, destination target channel adapters (TCA) may be used to provide an interface between the multi-stage switched network and an I/O controller (e.g., storage and networking devices) of either a second network or an I/O unit via high speed NGIO/InfiniBand links. Separately, another target channel adapter (TCA) may be used to provide an interface between a memory controller (not shown) of the remote system and the switched network via high speed NGIO/InfiniBand links. Both the host channel adapter (HCA) and the target channel adapter (TCA) may be broadly considered as network adapters provided to interface either the host system or any one of the remote systems to the switched network, and may be implemented in compliance with "*Next Generation I/O Link Architecture Specification: HCA Specification*, Revision 1.0" as set forth by NGIO Forum on May 13, 1999 for enabling the endpoints (nodes) to communicate to each other over NGIO/InfiniBand channel(s). However, NGIO/InfiniBand is merely one example embodiment or implementation of the various embodiments described and claimed. Rather, the various embodiments may be applicable to a wide variety of any number of data networks, hosts and I/O units. For example, practice of the various embodiments may also be made with future specifications that may be published as part of the InfiniBand™ Architecture Specification as set forth by the InfiniBand Trade Association, having an Internet address of http://www.Infinibandta.org.

In various embodiments, client processes running on the host communicate with the transport layer of the IB network by manipulating transport service instances, known as "queue pairs" (QPs), each made up of a send work queue and a receive work queue. Communications take place between a local QP maintained by the HCA and a remote QP maintained by a target channel adapter at the other side of the network. To send and receive messages over the network, the client/host initiates work requests (WRs), which cause work items, called work queue elements (WQEs), to be placed in appropriate queues within the HCA. For each work request, the client/host prepares a descriptor defining the operation to be performed by the HCA. Each WQE specifies a corresponding request, from a consumer application executed by the host (i.e., "requester"), for a corresponding prescribed operation to be performed by a destination InfiniBand network node (i.e., "responder"), for example a target. The interaction between requester and responder is specified via the QP. In general, the HCA executes WQE's on a particular work queue in the order that the WQE's were placed on the particular work queue. When the HCA completes a WQE, a completion queue element ("CQE") may be placed on a completion queue.

The various embodiments of the data network described and claimed herein include multi-stage switched network elements including of a plurality of switches for allowing a host system and a remote system to communicate to a large number of other host systems and remote systems over one or more designated channels. A channel connection can be considered an abstraction that is established over the switched network to allow two QP's at source and destination endpoints (e.g., host and remote systems, and I/O units that are connected to the switched network) to communicate with each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient, but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of packets between the end stations and switches via corresponding network elements.

For remote direct memory access (RDMA) and send operations between a host and a target node, the work request descriptor typically contains a gather list pointing to data that are to be read out of memory and transmitted as part of the message. To execute RDMA write and send operations, the HCA reads the corresponding descriptors, fetches the data specified in the gather list from the host memory, and loads the data into packets for transmission over the network to the remote QP. Because the gather list in a single WR may specify as much as $2^{31}$ bytes (2 GB) of data to be transmitted, while the IB network does not support packets larger than 4 KB, some WQE's can require the HCA to generate a large number of packets. In a typical implementation, each QP has its own maximum transfer unit (MTU), or maximum packet size, which may be, for example, 256, 512, 1024, 2048 or 4096 bytes. Unlike TCP/IP, however, in which there is no fixed relation between message boundaries and packet boundaries, the IB transport layer protocol specifies that each WR and WQE corresponds to a single message. The boundaries of the first and last packet for a given WQE thus correspond to the boundaries of the message. The size of the first and subsequent packets, except for the last packet, is equal to the MTU. The last packet takes up the remainder of the message, of length less than or equal to the MTU.

In generating an outgoing message or servicing an incoming message on any given QP, the HCA uses context information pertaining to the QP. The QP context is created in a memory accessible to the HCA by the host process that sets up the QP. The host configures the QP context with fixed information such as the destination address, negotiated operating limits, service level and keys for access control. Typically, a variable part of the context, such as the current packet sequence number (PSN) and information regarding the WQE being serviced by the QP, is subsequently updated by the HCA as it sends and receives messages. For example, to service an incoming packet on a reliable connection, the HCA reads the packet transport header, which identifies the target QP, and uses the context of that QP to verify that the packet came from the correct source and that the PSN is valid (no missed packets). Based on this information, the HCA generates the appropriate acknowledgment (ACK or NACK) or other response. As another example, to generate a RDMA write request on a reliable connection, the HCA reads the WQE and retrieves necessary data from the QP context, such as the destination address, target QP and next PSN. It then accesses the host memory to fetch the required data, and sends the packet to the destination.

The WQE may include service level (SL) information, and a pointer to the location of the actual message in the system memory. The InfiniBand™ Architecture Specification defines a service level (SL) attribute that permits a packet traversing the InfiniBand network to operate at one of sixteen available service levels. Hence, the requester can select an available service level (e.g., quality of service, priority, etc.) based on a selected priority of the WQE. A conventional pre-link module provides both service level to virtual lane mapping (SL-VL mapping), and virtual lane arbitration. In particular, virtual lanes, defined in the InfiniBand Architecture Specification, enable multiple logical flows to be implemented over a single physical link, where link level flow control can be applied to one virtual lane without affecting other virtual lanes. The pre-link process module is configured for managing and maintaining a service layer-virtual layer mapping table. In particular, the pre-link process module retrieves a WQE from a WQE first-in-first-out queue (FIFO), and determines the corresponding virtual lane based on the service layer specified within the WQE. Upon identifying the appropriate virtual lane for the retrieved WQE, the pre-link process module forwards the WQE to the corresponding virtual lane FIFO.

One conventional network architecture (InfiniBand™) defines packet formats of message data for transmission from a source node (host) to a destination node (target) through switches and/or intermediate nodes according to the "InfiniBand™ Architecture Specification" referenced above. This message data may represent a sequence of one or more data packets (typically derived from data transfer size defined by a work request). Each packet may include header information, a variable format packet payload, and cyclic redundancy check (CRC) information. Under the "Next Generation Input/Output (NGIO) Specification" as previously referenced, the same data packets may be referred to as data cells having similar header information. For purposes of this disclosure, data packets are described herein via InfiniBand protocols, but are also interchangeable with data cells via NGIO protocols and other similar conventional data packet protocols.

The header information according to the InfiniBand specification may include different types of headers, including: for example, a local routing header, a global routing header, a base transport header and extended transport headers, such as data extended transport header, a RDMA extended transport header, and an Atomic extended transport header.

Referring to FIG. 1, a conventional InfiniBand network architecture is illustrated. As shown, a host 111 includes a set of server blades, each of which includes a host channel adapter (HCA). In an InfiniBand implementation, each HCA of host 111 provides a data channel to an InfiniBand backplane 113, which routes a plurality of data channels to an InfiniBand switch 117. InfiniBand switch 117 subsequently routes message traffic to an appropriate one of target channel adapters 119 corresponding to message destination nodes.

Figure 2:
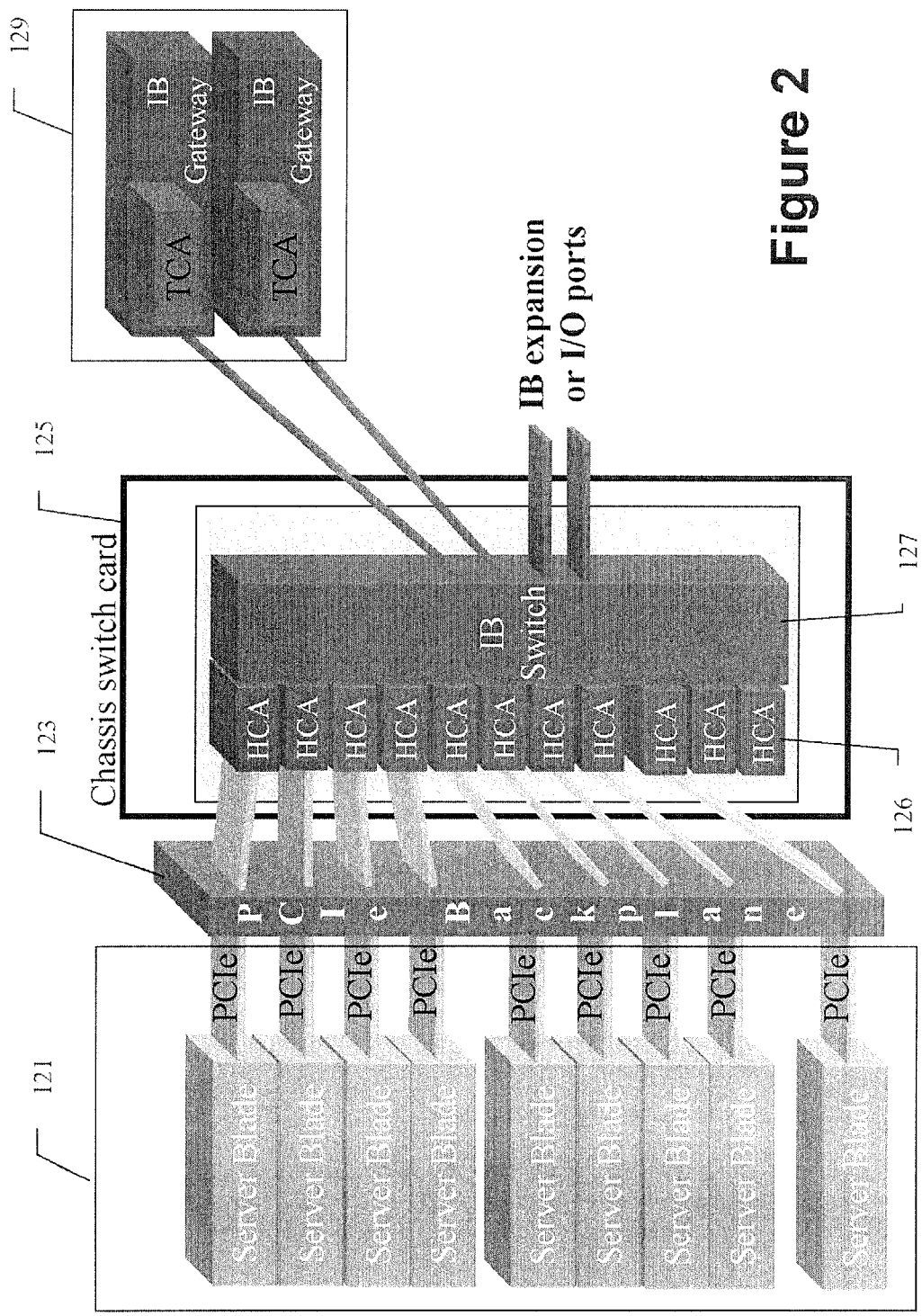
FIG. 2 illustrates an embodiment in which the HCA hardware is resident in the network switch.

In some circumstances, it can be expensive and inefficient to replicate HCA hardware in host 111. For this reason, one embodiment moves the HCA hardware into the network switch. Such an embodiment is illustrated in FIG. 2. In FIG. 2, host 121 no longer has HCA hardware coupled directly to each of the server blades in host 121. Instead, the server blades of host 121 interface directly with a PCI-e backplane 123 (e.g. a host backplane). PCI-e backplane 123 routes a plurality of data channels to a set of switch-logic-resident hardware HCA's 126 embedded on switch logic 125. Switch-logic-resident hardware HCA's 126 are directly coupled to an InfiniBand switch 127 (e.g. a protocol-specific switch). InfiniBand switch 127 routes message traffic from the switch-logic-resident hardware HCA's 126 to an appropriate one of target channel adapters 129 corresponding to message destination nodes.

Figure 3:
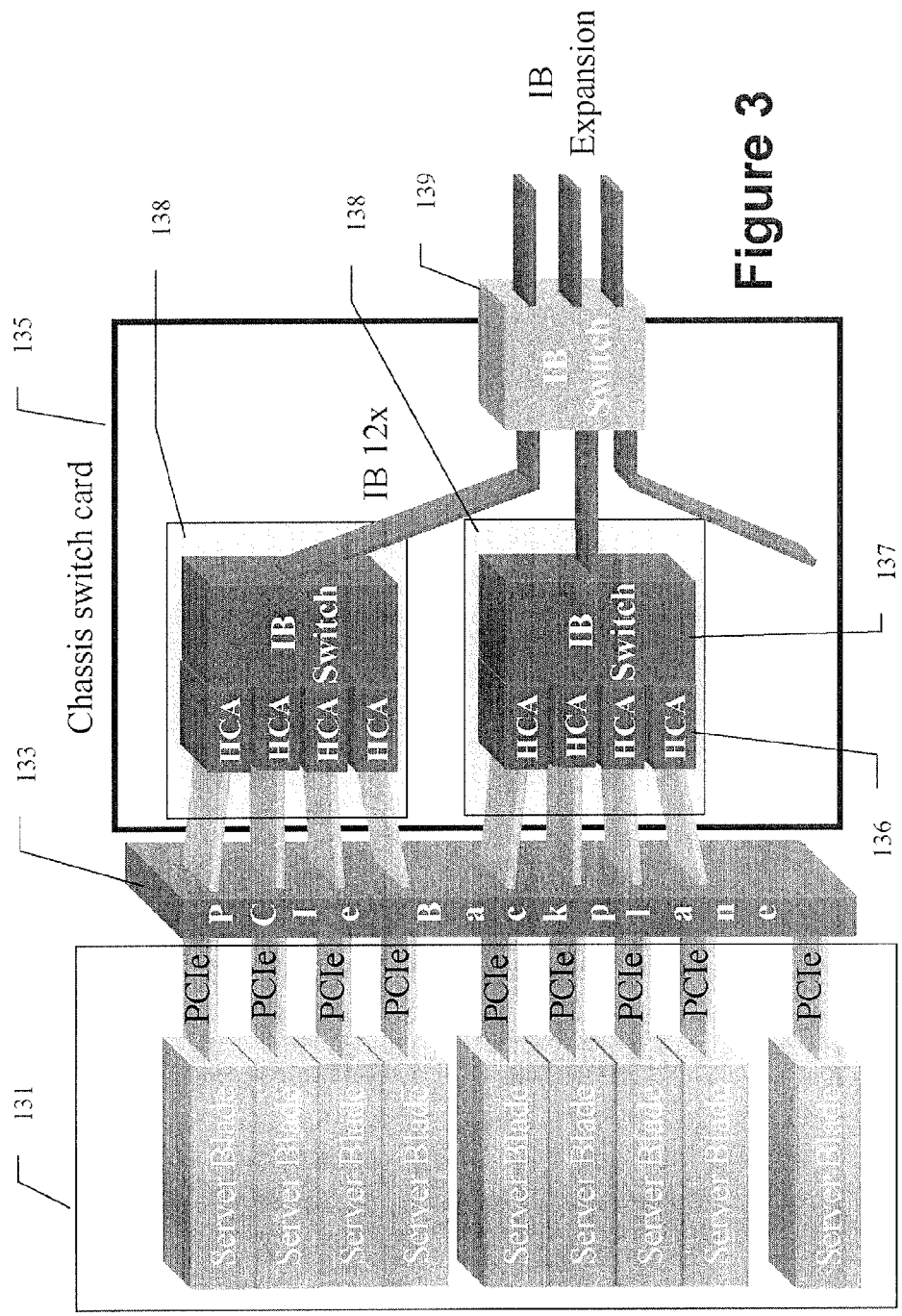
FIG. 3 illustrates an embodiment in which the HCA hardware is resident in the network switch and partitioned into smaller sets of switch-logic-resident HCA hardware.

Because the implementation of a plurality of switch-logic-resident hardware HCA's 126 on switch 125 can consume a substantial portion of the available logic space on switch 125, it may be necessary to limit the number of switch-logic-resident hardware HCA's 126 installed on switch 125. Alternatively, it can be advantageous to partition smaller sets of switch-logic-resident hardware HCA's 126 on switch 125. Such an embodiment is illustrated in FIG. 3. In FIG. 3, sets 138 of switch-logic-resident hardware HCA's 126 are embedded in switch 135. Each set 138 includes a smaller group of switch-logic-resident hardware HCA's 136 and a corresponding InfiniBand switch 137. The message traffic to/from each of the HCA sets 138 is routed through another InfiniBand switch 139. The network switch implementation illustrated in FIG. 3 provides an alternative to the implementation illustrated in FIG. 2. The network switch implementation illustrated in FIG. 3 enables the configuring and scaling of switch-logic-resident hardware HCA's on switch 135, thereby potentially reducing the logic space requirements in switch 135.

Although the implementations of a network switch illustrated in FIGS. 2 and 3 provide a convenient means for collecting HCA hardware in a single logic-resident switch, these implementations still replicate the same HCA hardware for each data channel of the switch. In some circumstances, such replication of HCA hardware can increase cost or render the implementation of the network switch difficult. For these reasons, another alternative embodiment of a network switch system is illustrated in FIG. 4.

Figure 4:
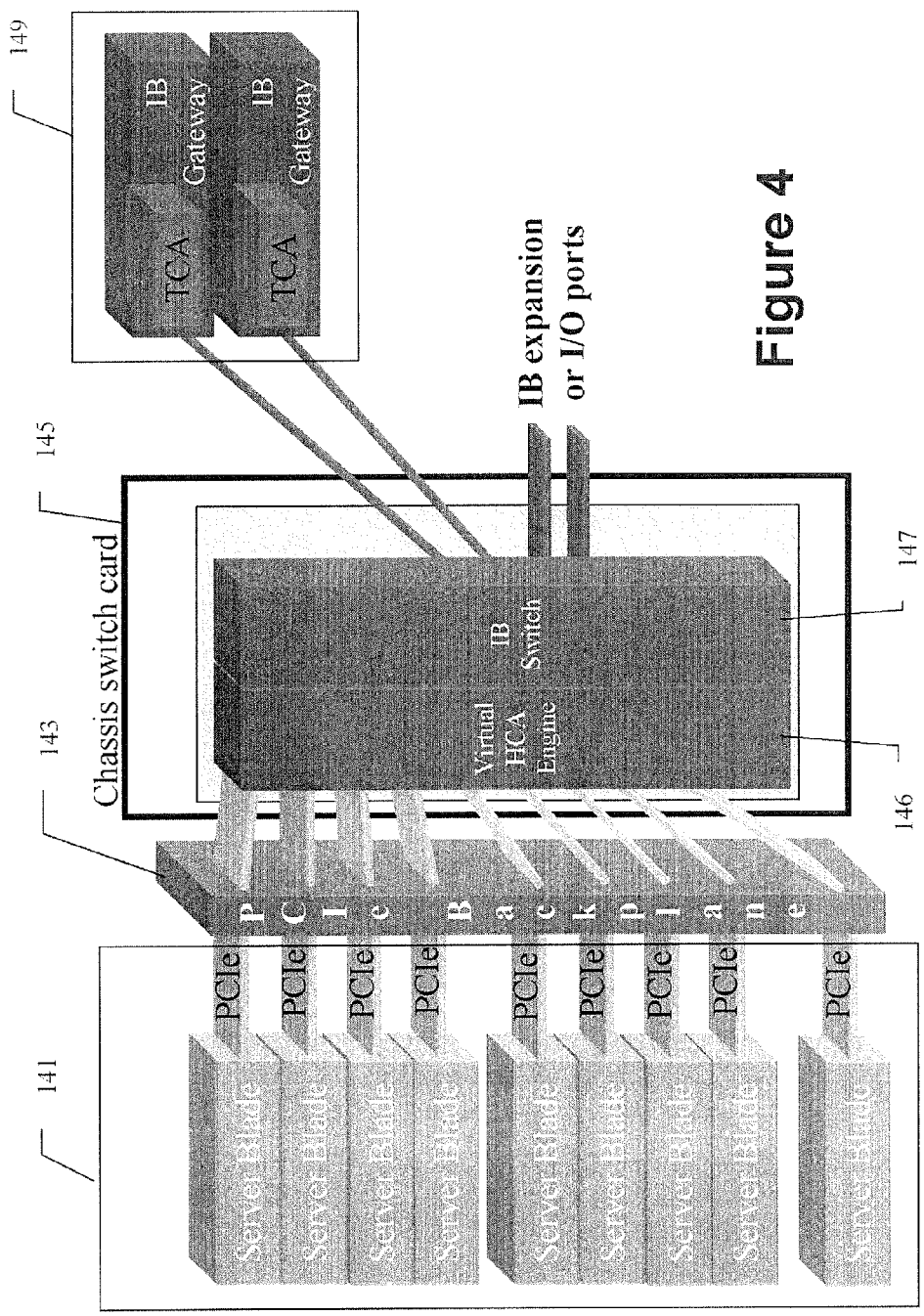
FIG. 4 illustrates an embodiment of a network switch with virtual HCA hardware resident in the network switch.

FIG. 4 illustrates an embodiment of a network switch with virtual HCA hardware resident in a virtual HCA engine 146 resident in the network switch 145. In this embodiment, the server blades of host 141 interface directly with a PCI-e backplane 143. PCI-e backplane 143 routes a plurality of data channels to a virtual HCA engine 146 embedded on switch logic 145. Virtual HCA engine 146 is directly coupled to an InfiniBand switch 147. InfiniBand switch 147 routes message traffic from the virtual HCA engine 146 to an appropriate one of target channel adapters 149 corresponding to message destination nodes. As will be described in more detail below, virtual HCA engine 146 creates a virtual HCA instance corresponding to one of the hardware HCA's provided in conventional systems or in the embodiments described above. Virtual HCA engine 146 thereby provides multiple virtual HCA's on a single logic device. As such, virtual HCA engine 146 can retain substantially the same functionality as multiple hardware HCA's; yet, the virtual HCA engine 146 has a much smaller requirement for hardware logic space on switch 145. Virtual HCA engine 146 provides an internal shared memory for efficiency of communications between HCA instances. In addition, virtual HCA engine 146 provides a much more configurable, scalable, and expandable network switch as will be described in more detail below.

Figure 5:
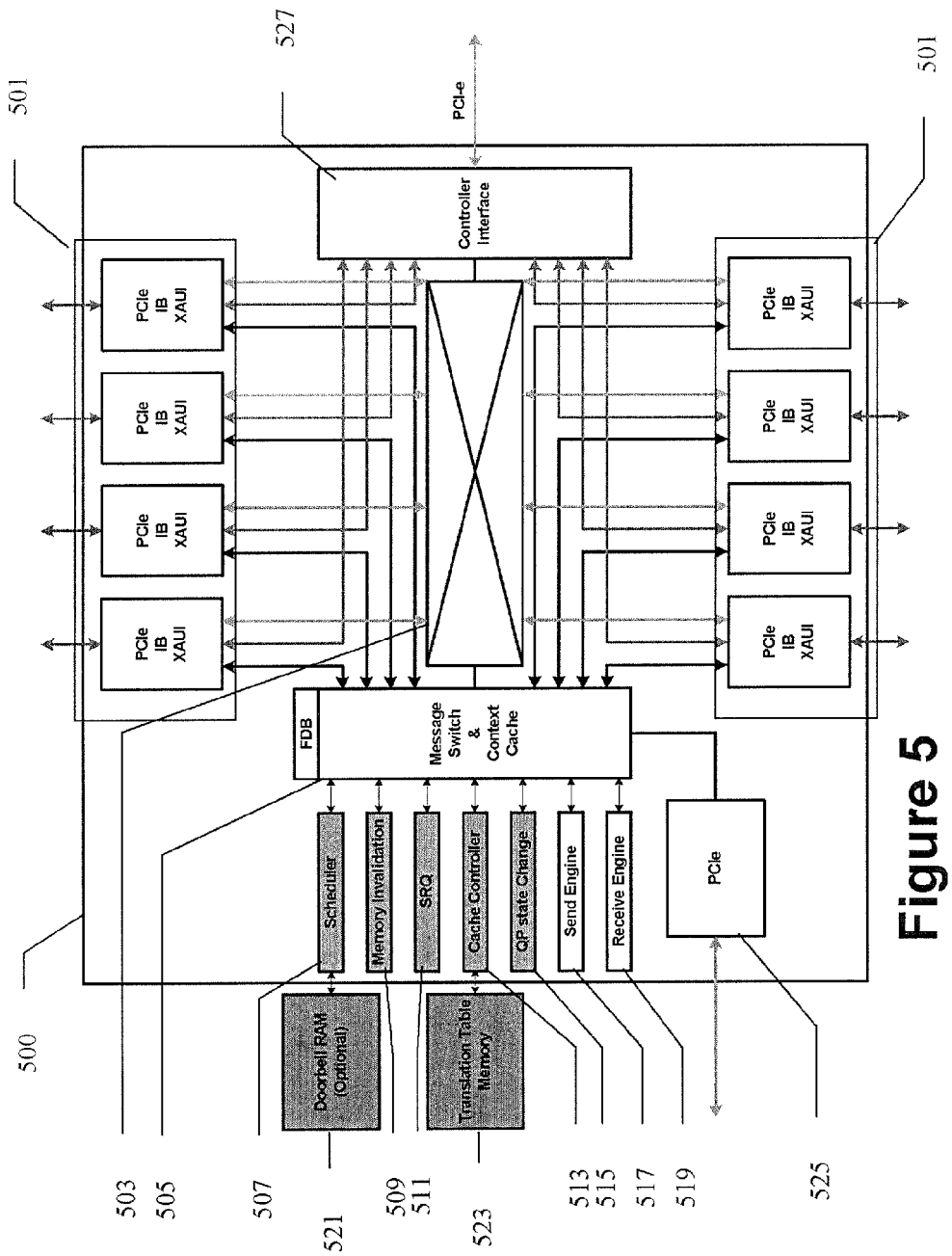
FIG. 5 illustrates an embodiment of the virtual HCA hardware resident in the network switch.

Referring now to FIG. 5, an example embodiment of virtual HCA engine 500 is illustrated. As shown, virtual HCA engine 500 includes a set of input/output ports 501, which provide a set of data channels for data communications between a host node and a target node. In the example embodiment illustrated in FIG. 5, eight such data channels are provided. As such, the embodiment illustrated in FIG. 5 can support up to 64 virtual HCA's. It will be apparent to one of ordinary skill in the art that a different number of data channels in a particular embodiment may be used. Because of the highly configurable nature of virtual HCA engine 500, as will be described in more detail below, each of the input/output ports 501 can be used to transfer data using a variety of hardware interfaces and data transfer protocols (e.g. PCI-e, IB, XAUI, etc.). Each of the ports 501 are coupled to a data switch 503, which is used under control of message switch 505 to interconnect any two ports of ports 501 for the transfer of a message data payload between a sender and a receiver coupled to the interconnected ports. In this manner, virtual HCA engine 500 can be used to transfer message data payloads between a plurality of senders and a plurality of receivers. Each of ports 501 are also connected to controller interface 527. Controller interface 527 is used in one embodiment as a management interface to monitor and configure virtual HCA engine 500.

As illustrated in FIG. 5, virtual HCA engine 500 includes a set of onboard dedicated processing components to support a plurality of virtual HCA's. These processing components include scheduler 507, memory invalidation engine 509, shared receive queue (SRQ) 511, cache controller 513, QP state change controller 515, send engine 517, and receive engine 519. These processing components will be described in more detail below.

Scheduler 507 handles the sequencing of processing operations performed by virtual HCA engine 500. To send and receive messages over the network, the client/host initiates work requests (WRs), which cause work items, called work queue elements (WQEs), to be placed in memory accessible to the virtual HCA engine 500. For each work request, the client/host prepares a descriptor defining the operation to be performed by one of the virtual HCA's supported by the virtual HCA engine 500. The WQE or ancillary data can specify the identity of the virtual HCA associated with the particular WQE. Each WQE specifies a corresponding request, from a consumer application executed by the host (i.e., "requester"), for a corresponding prescribed operation to be performed by a destination network node (i.e., "responder"), for example a target. Client processes running on the host communicate with the transport layer of the network by manipulating transport service instances, (i.e. QP's), each made up of a send work queue and a receive work queue. Communications take place between a local QP maintained by the virtual HCA engine 500 and a remote QP maintained by a target channel adapter at the other side of the network. The interaction between requester and responder is specified via the QP. Once the client/host has prepared the WR defining the network operation to be performed, the client/host signals the new WR to the virtual HCA engine 500 using a doorbell (e.g. interrupt) signal. For example, the client/host can write to a register in PCI space to signal virtual HCA engine 500. In one embodiment, these doorbell signals are provided to scheduler 507 via a doorbell memory 521. Doorbell memory 521 provides a first-in-first-out (FIFO) buffer for retaining incoming doorbell signals that may be received in rapid succession. In general, the virtual HCA engine 500 executes WQE's in the order that the WQE's were signaled to the virtual HCA engine 500. In one embodiment, dual schedulers within scheduler 507 can be implemented to handle send side and response side scheduling. In addition, scheduler 507 can include a plurality of queues to retain incoming QP's in a plurality of quality-of-service (QoS) levels, the highest priority QP's being handled first by scheduler 507.

Send Engine 517 processes send work queues of a QP. This processing involves the generation of data packets for retaining the content of a message to be sent and managing the sending of the data packets out of the appropriate one of ports 501 to the target node (i.e. destination) of the message. Send Engine 517 also generates the necessary packet headers and retrieves the data payload to be sent from a designated memory area as defined by the send work queue. Send Engine 517 also handles the receipt of an acknowledgement from the target node upon the successful transfer of each data packet or the processing necessary after a data packet transfer time-out. Send Engine 517 handles multiple concurrent contexts corresponding to multiple concurrent active virtual HCA's. Because the processing performed by Send Engine 517 is message-based, each active context is valid until the transfer of the associated message is complete.

Receive Engine 519 processes receive work queues of a QP. This processing involves the procurement of a local memory area for the received data and managing the receipt of the data packets via one of ports 501 from the source node (i.e. source) of the received message. Receive Engine 519 also handles the retrieval of the data payload from each received data packet and transferring the data payload to a designated memory area as defined by the receive work queue. The Receive Engine 519 also handles the generation and sending of an acknowledgement to the source node upon the successful receipt of each data packet. Receive Engine 519 handles multiple concurrent contexts corresponding to multiple concurrent active virtual HCA's. Because the processing performed by Receive Engine 519 is message-based, each active context is valid until the receipt of the associated message is complete.

QP State Change controller 515 is a central controller for managing and sequencing all QP state changes requested by the host or by any of the processing components of virtual HCA engine 500. Because there may be multiple concurrent contexts active in virtual HCA engine 500 at any one time, it is beneficial to coordinate QP state changes through a central controller (i.e. QP State Change controller 515). In various embodiments, QP states can include, for example: ready to receive, ready to transmit, various error states, migrating state, etc. In most cases, a QP state change is initiated by a virtual HCA or by the host.

Shared receive queue (SRQ) 511 manages and serializes the sharing of message data input buffers among multiple WQE's and contexts. Shared receive queues for single physical HCA's are known in the InfiniBand network. Shared receive queue (SRQ) 511 handles shared receive queues across multiple contexts in the virtual HCA engine 500. In this manner, Shared receive queue (SRQ) 511 prevents conflicts in the allocation and use of shared receive queues across multiple contexts.

Memory Invalidation Engine 509 is a central controller for managing and sequencing all memory read requests and memory invalidation requests as requested by the host driver or by any of the processing components of virtual HCA engine 500. Because there may be multiple concurrent contexts active in virtual HCA engine 500 at any one time, it is beneficial to coordinate memory read requests and memory invalidation requests through a central controller (i.e. Memory Invalidation Engine 509). In most cases, the Memory Invalidation Engine 509 interacts with the Send Engine 517 and the Receive Engine 519 for memory read requests. In addition, Memory Invalidation Engine 509 also interacts with the host driver, send work queues, and target nodes via "Send with Invalidate" messages for memory invalidation requests.

Cache Controller 513 is a central controller for managing and sequencing all cache memory access as requested by any of the processing components of virtual HCA engine 500.

Because there may be multiple concurrent contexts active in virtual HCA engine 500 at any one time, it is beneficial to coordinate cache memory access through a central controller (i.e. Cache Controller 513). In one embodiment, Cache Controller 513 coordinates access to a cache memory in message switch 505. It will be apparent to those of ordinary skill in the art that cache memory could be implemented elsewhere in virtual HCA engine 500. In most cases, it is efficient to store virtual HCA context information in cache memory. In this manner, context information is readily available to any of the processing components of virtual HCA engine 500, access to which is controlled by Cache Controller 513.

Message switch and context cache 505 is a central controller for managing and sequencing all shared memory access as requested by any of the processing components of virtual HCA engine 500. Because there may be multiple concurrent contexts active in virtual HCA engine 500 at any one time, it is beneficial to coordinate shared memory access through a central controller (i.e. Message switch and context cache 505). In one embodiment, Message switch and context cache 505 and Cache controller 513 coordinate access to shared memory and a cache memory in message switch 505. Data corresponding to memory requests that miss the cache can be retrieved from shared memory and retained in the cache for subsequent use by other processing components in virtual HCA engine 500. In one embodiment, messages processed by Message switch and context cache 505 can be partitioned into a header portion and a data payload portion. The header portion of such messages can be processed and/or updated by Message switch and context cache 505 as the message is processed for transmission to a target node or received from a target node. The data payload portion of the message can be directly routed via data switch 503 to one of the ports 501 for transmission to the target node or received via data switch 503 through one of the ports 501 from the target node. The corresponding message header is used by Message switch and context cache 505 to control data switch 503 to direct the associated data payload portion of the message to the appropriate destination. In one embodiment, messages processed by Message switch and context cache 505 can include a header portion without a corresponding data payload portion. In this case, Message switch and context cache 505 can route the message (without data payload) directly to/from a target node via ports 501.

Further details of Message switch and context cache 505 are provided in co-pending U.S. patent application Ser. No. 11/469,447, filed Aug. 31, 2006, by the same assignee as the present patent application.

In one embodiment, an additional auxiliary port 525 is provided in virtual HCA engine 500. Auxiliary port 525 provides a means to configure virtual HCA engine 500 in one of several operating modes. In one embodiment, auxiliary port 525 is a PCIe port capable of transmitting/receiving data via a PCIe interface.

In one embodiment, a controller interface 527 with an external PCIe interface is provided in virtual HCA engine 500. Controller interface 527 provides a maintenance interface for virtual HCA engine 500.

Figure 6:
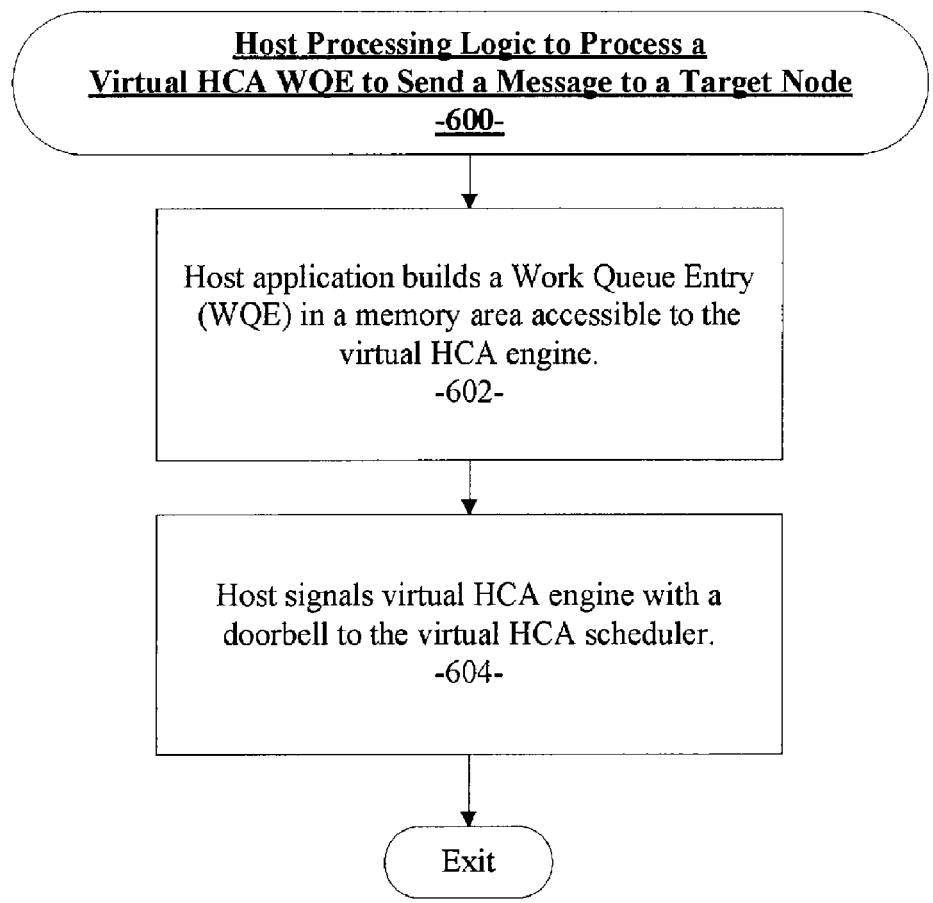
FIGS. 6-10 are flowcharts illustrating an embodiment of the host and virtual HCA processing logic to send a data packet to a target node.

Referring now to FIGS. 6 through 10, processing performed by a host and virtual HCA engine 500 for sending a message to a target node is illustrated. Referring to FIG. 6, a host application program running on the host builds a work queue entry (WQE) data structure in a memory area accessible to the virtual HCA engine 500 (processing box 602). In processing block 604, the host signals the presence of a new WQE to the virtual HCA engine 500 with a doorbell signal provided to virtual HCA scheduler 507. Host application processing then terminates at the exit bubble illustrated in FIG. 6.

Figure 7:
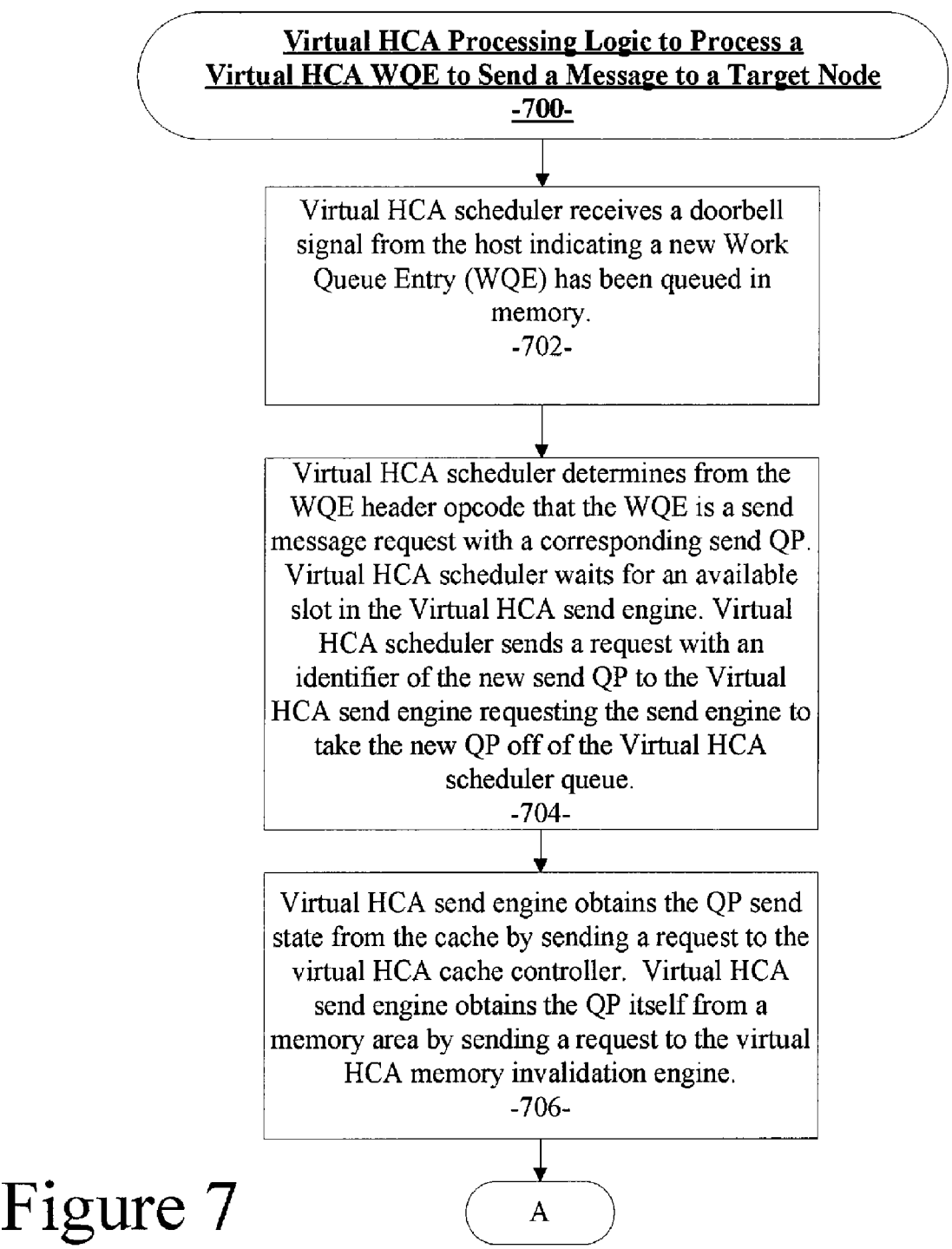

Referring to FIG. 7, virtual HCA engine 500 processing for sending a message to a target node starts with processing block 702. In processing block 702, virtual HCA scheduler 507 receives a doorbell signal from the host indicating the presence of a new WQE that has been queued in memory by the host. In processing block 704, virtual HCA scheduler 507 determines from the WQE header opcode that the WQE is a send message request. Virtual HCA scheduler 507 waits for an available slot in the work queue of virtual HCA send engine 517. When a work queue slot in the virtual HCA send engine 517 becomes available, virtual HCA scheduler 507 sends a request with an identifier of the new QP (a component of the new WQE) to the virtual HCA send engine 517 requesting the send engine 517 to take the new QP off of the virtual HCA scheduler 507 queue. In processing block 706, send engine 517 obtains the QP send state from the cache in message switch and context cache 505 by sending a request to the virtual HCA cache controller 513. Virtual HCA send engine 517 obtains the QP itself from a memory area by sending a request to the virtual HCA memory invalidation engine 509. Processing then continues at the bubble A illustrated in FIG. 8.

Figure 8:
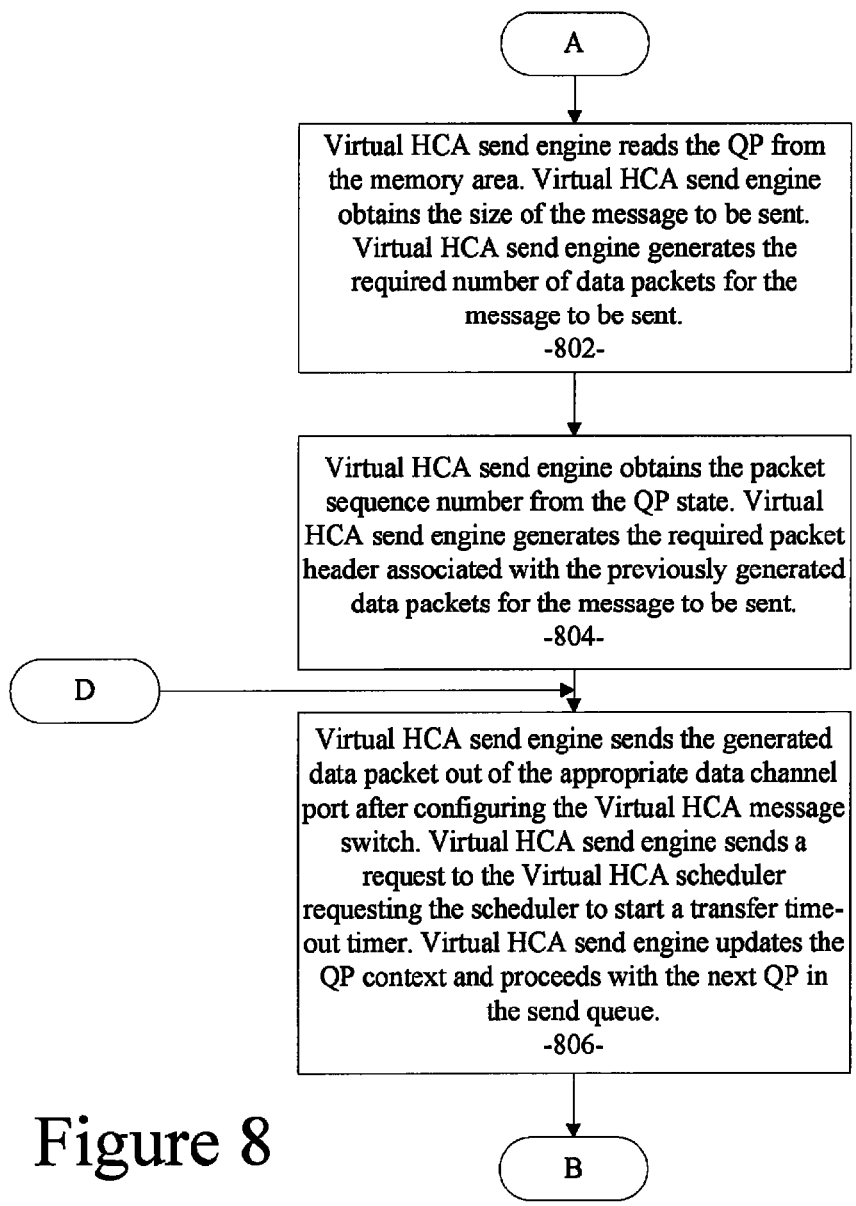

Referring to FIG. 8, virtual HCA engine 500 processing logic continues at the bubble A. In processing block 802, virtual HCA send engine 517 reads the QP from the memory area. Virtual HCA send engine 517 obtains the size of the message to be sent from the QP. Send engine 517 generates the required number of data packets for the message to be sent. In processing block 804, send engine 517 obtains the packet sequence number from the QP state. Send engine 517 generates the required packet header associated with the previously generated data packets for the message to be sent. In processing block 806, send engine 517 sends the generated data packet out of the appropriate data channel port 501 after configuring the virtual HCA message switch and context cache 505. Send engine 517 then sends a request to the virtual HCA scheduler 507 requesting scheduler 507 to start a transfer timeout timer. Send engine 517 updates the QP context and proceeds with the next QP in the send work queue. Processing then continues at the bubble B illustrated in FIG. 9.

Figure 9:
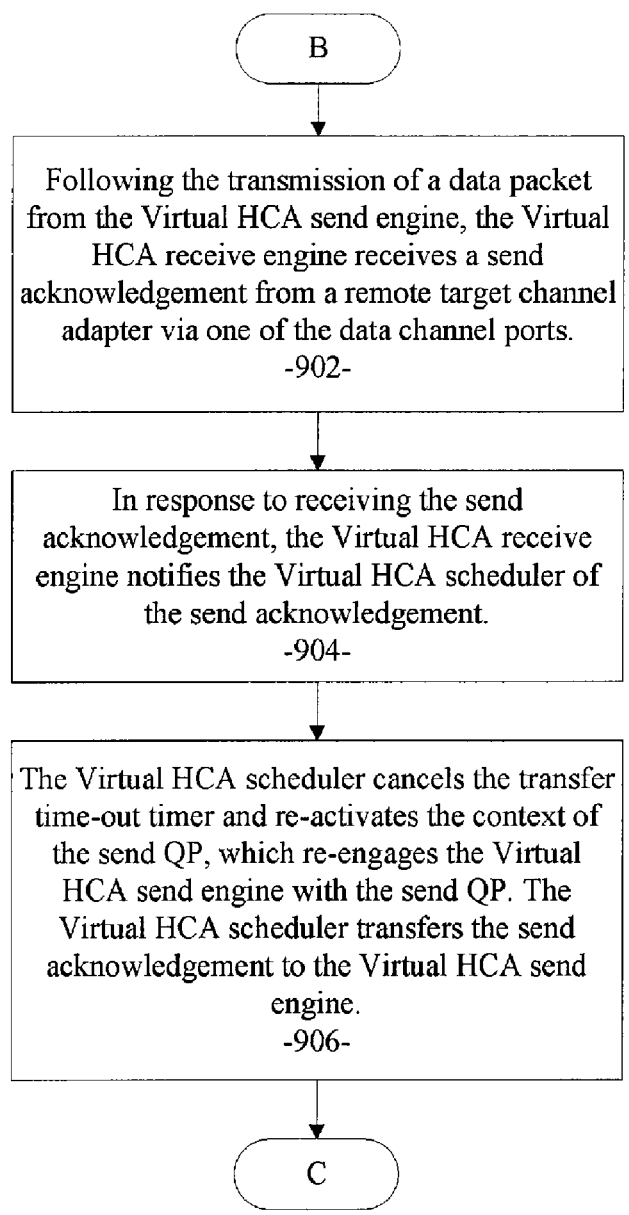

Referring to FIG. 9, virtual HCA engine 500 processing logic continues at the bubble B. In processing block 902, following the transmission of a data packet from the virtual HCA send engine 517, the virtual HCA receive engine 519 eventually receives a send acknowledgment from a remote target channel adapter via one of the data channel ports 501. In response to receiving the send acknowledgment, the virtual HCA receive engine 519 notifies the virtual HCA scheduler 507 of the receipt of the send acknowledgment (processing block 904). In processing block 906, virtual HCA scheduler 507 cancels the transfer timeout timer and re-activates the context of the send QP corresponding to the received send acknowledgment. The reactivation of the context of the send QP re-engages virtual HCA send engine 517 with the reactivated send QP. The virtual HCA scheduler 507 transfers the send acknowledgment to the virtual HCA send engine 517. Processing then continues at the bubble C illustrated in FIG. 10.

Figure 10:
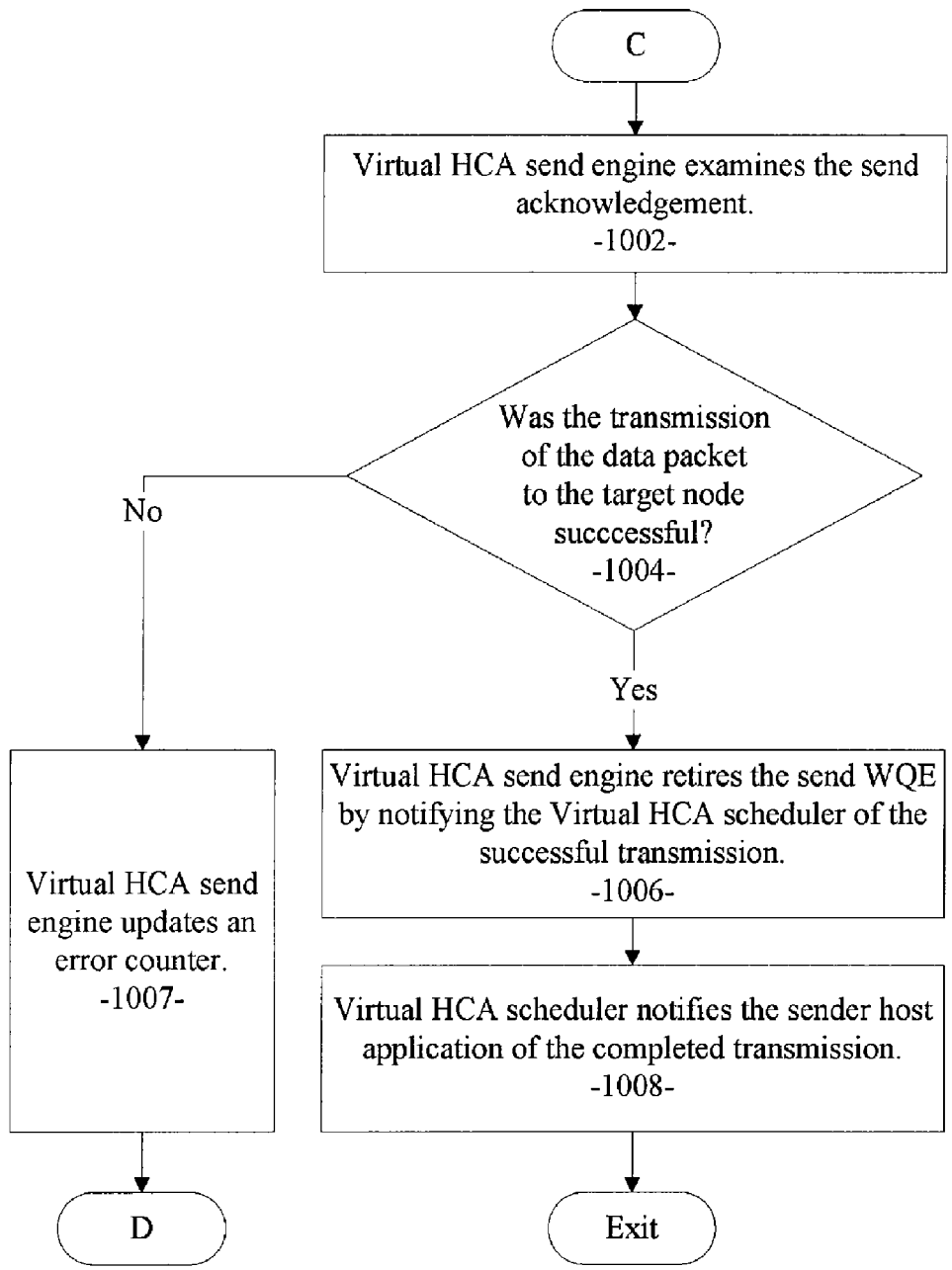

Referring to FIG. 10, virtual HCA engine 500 processing logic continues at the bubble C. In processing block 1002, virtual HCA send engine 517 examines the received send acknowledgment. If the send acknowledgment indicates that the corresponding prior transmission of the data packet to the target node was successful (decision block 1004), processing continues at processing block 1006. If the send acknowledgment indicates that the corresponding prior transmission of the data packet to the target node was not successful (decision block 1004), processing continues at processing block 1007. In processing block 1006, because the data packet transmission was successful, virtual HCA send engine 517 retires the send WQE by notifying the virtual HCA scheduler 507 of the successful transmission. Virtual HCA scheduler 507 notifies the sender host application of the successful data packet transmission (processing block 1008). Virtual HCA engine 500 processing logic then terminates at the exit bubble shown in FIG. 10. In processing block 1007, because the data packet transmission was unsuccessful, virtual HCA send engine 517 updates an error counter and processing continues at the bubble D illustrated in FIG. 8, where virtual HCA send engine 517 resends the generated data packet to the appropriate target node. The process continues until the data packet is successfully sent or a maximum number of attempted transmissions is exceeded.

Figure 11:
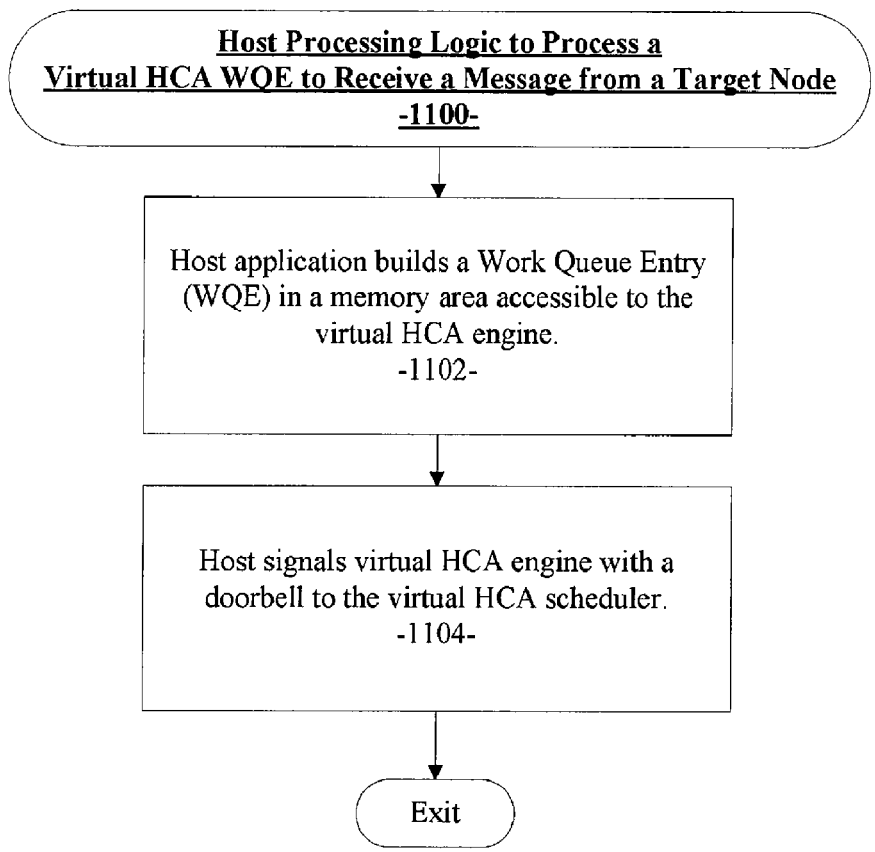
FIGS. 11-16 are flowcharts illustrating an embodiment of the host and virtual HCA processing logic to receive a message from a target node.

Referring now to FIGS. 11 through 16, processing performed by a host and virtual HCA engine 500 for receiving a message from a target node is illustrated. Referring to FIG. 11, a host application program running on the host builds a work queue entry (WQE) data structure in a memory area accessible to the virtual HCA engine 500 (processing box 1102). In processing block 1104, the host signals the presence of a new WQE to the virtual HCA engine 500 with a doorbell signal provided to virtual HCA scheduler 507. Host application processing then terminates at the exit bubble illustrated in FIG. 11.

Figure 12:
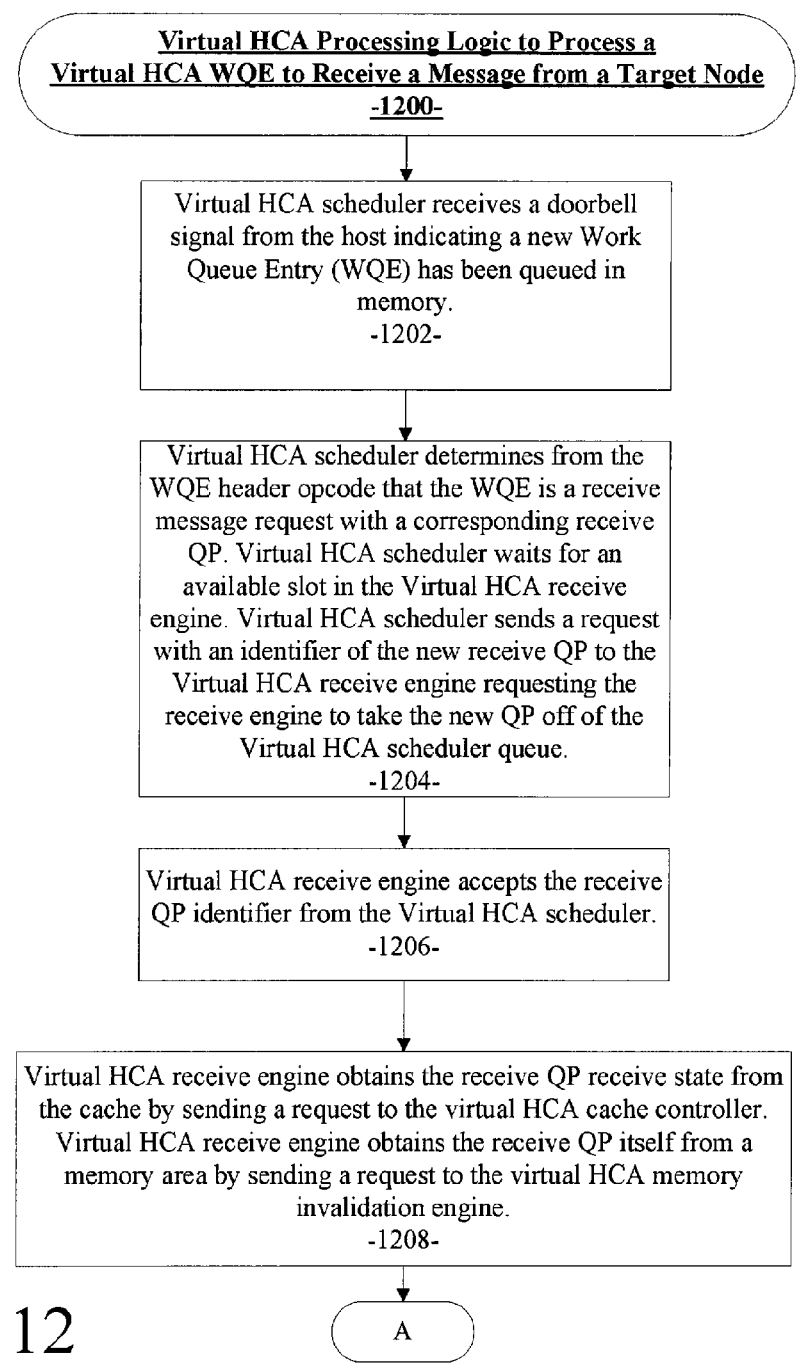

Referring to FIG. 12, virtual HCA engine 500 processing for receiving a message from a target node starts with processing block 1202. In processing block 1202, virtual HCA scheduler 507 receives a doorbell signal from the host indicating the presence of a new WQE that has been queued in memory by the host. In processing block 1204, virtual HCA scheduler 507 determines from the WQE header opcode that the WQE is a receive message request. Virtual HCA scheduler 507 waits for an available slot in the work queue of virtual HCA receive engine 519. When a work queue slot in the virtual HCA receive engine 519 becomes available, virtual HCA scheduler 507 sends a request with an identifier of the new receive QP (a component of the new WQE) to the virtual HCA receive engine 519 requesting the receive engine 519 to take the new QP off of the virtual HCA scheduler 507 queue. In processing block 1206, receive engine 519 accepts the receive QP identifier from the virtual HCA scheduler 507. In processing block 1208, the receive engine 519 obtains the QP receive state from the cache in message switch and context cache 505 by sending a request to the virtual HCA cache controller 513. Virtual HCA receive engine 519 obtains the QP itself from a memory area by sending a request to the virtual HCA memory invalidation engine 509. Processing then continues at the bubble A illustrated in FIG. 13.

Figure 13:
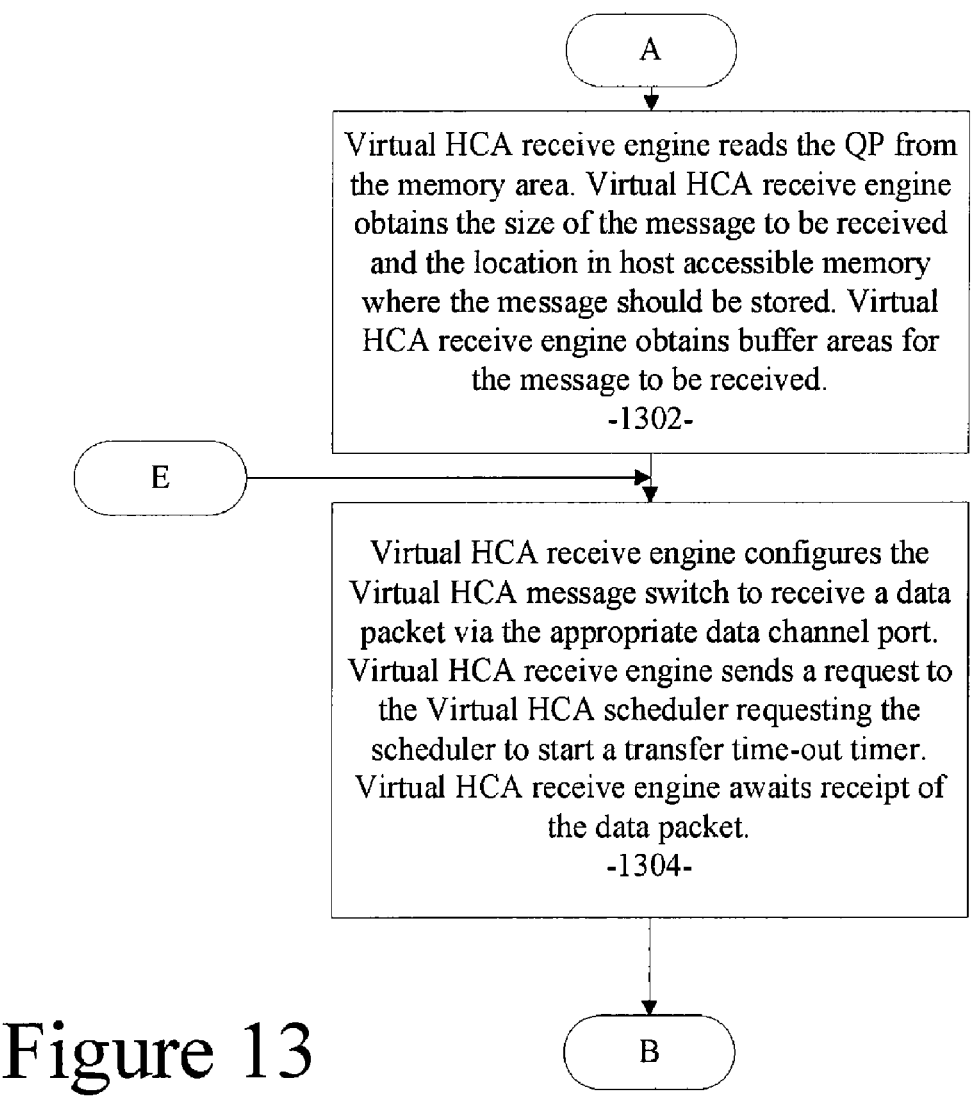

Referring to FIG. 13, virtual HCA engine 500 processing logic continues at the bubble A. In processing block 1302, virtual HCA receive engine 519 reads the QP from the memory area. Virtual HCA receive engine 519 obtains from the QP the size of the message to be received and the location in host accessible memory where the received message should be stored. Receive engine 519 obtains buffer areas for the message to be received. In processing block 1304, receive engine 519 configures the virtual HCA message switch and context cache 505 to receive a data packet via the appropriate data channel port. Receive engine 519 then sends a request to the virtual HCA scheduler 507 requesting scheduler 507 to start a transfer timeout timer. Receive engine 519 awaits the receipt of the data packet. Processing then continues at the bubble B illustrated in FIG. 14.

Figure 14:
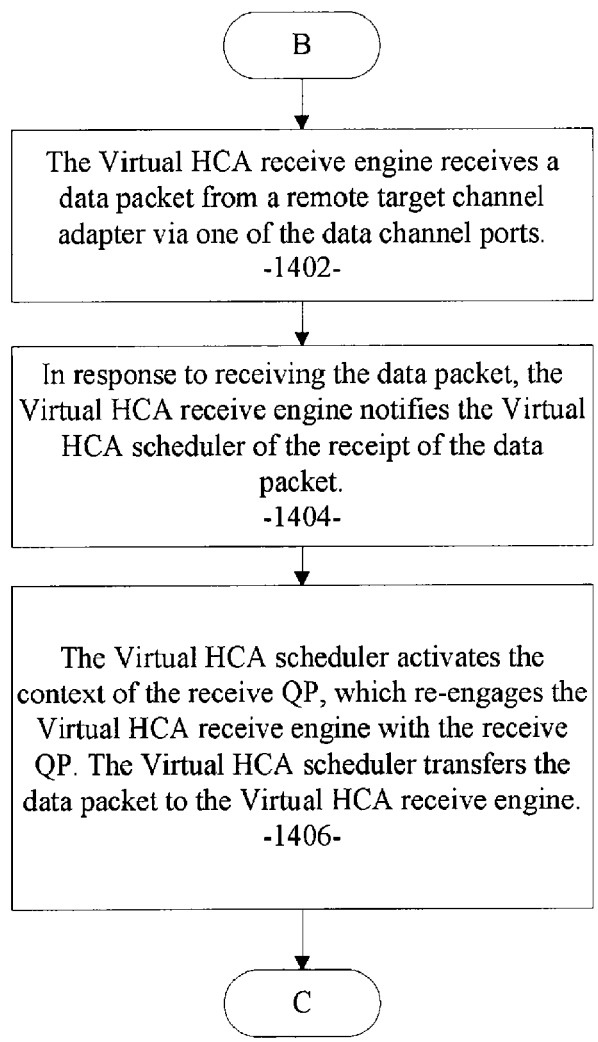

Referring to FIG. 14, virtual HCA engine 500 processing logic continues at the bubble B. In processing block 1402, the virtual HCA receive engine 519 eventually receives a data packet from a remote target channel adapter via one of the data channel ports 501. In response to receiving the data packet, the virtual HCA receive engine 519 notifies the virtual HCA scheduler 507 of the receipt of the data packet (processing block 1404). In processing block 1406, virtual HCA scheduler 507 activates the context of the receive QP corresponding to the received data packet. The reactivation of the context of the receive QP re-engages virtual HCA receive engine 519 with the reactivated receive QP. The virtual HCA scheduler 507 transfers the data packet to the virtual HCA receive engine 519. Processing then continues at the bubble C illustrated in FIG. 15.

Figure 15:
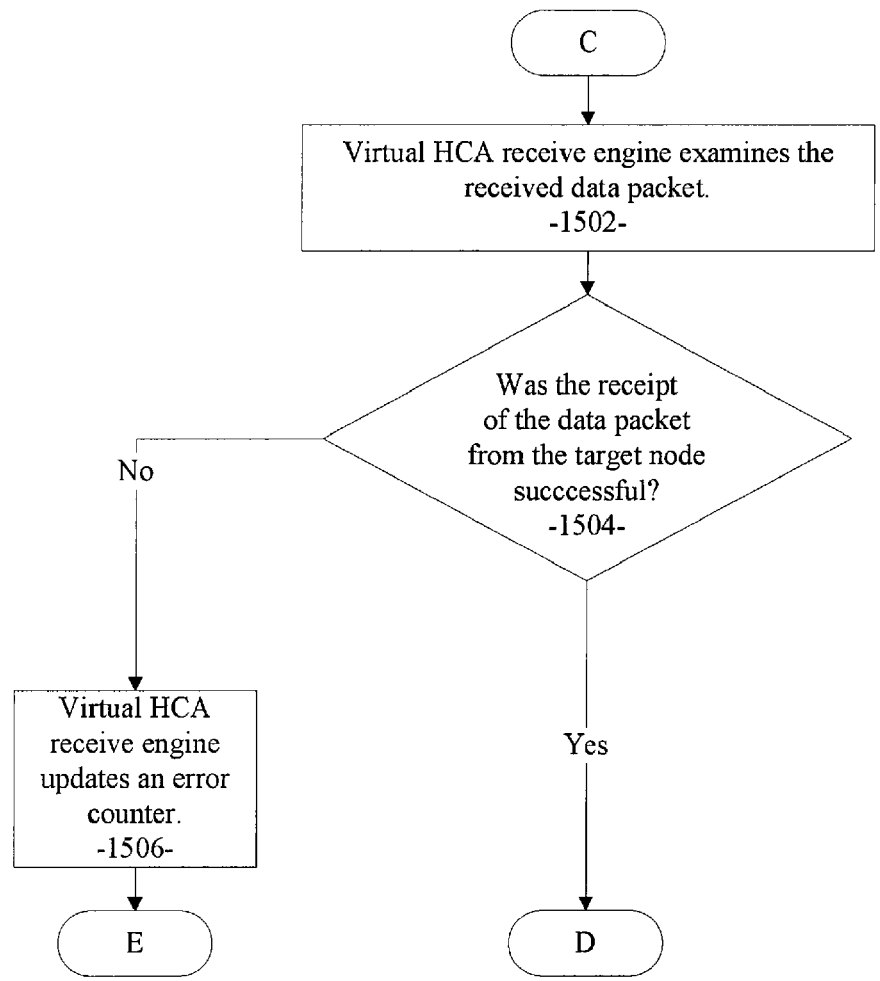

Referring to FIG. 15, virtual HCA engine 500 processing logic continues at the bubble C. In processing block 1502, virtual HCA receive engine 519 examines the received data packet. If the received data packet is valid, the transfer of the data packet from the target node was successful (decision block 1504). Processing continues at the bubble D illustrated in FIG. 16. If the data packet is not valid, the transfer of the data packet from the target node was not successful (decision block 1504). In this case, processing continues at processing block 1506.

Figure 16:
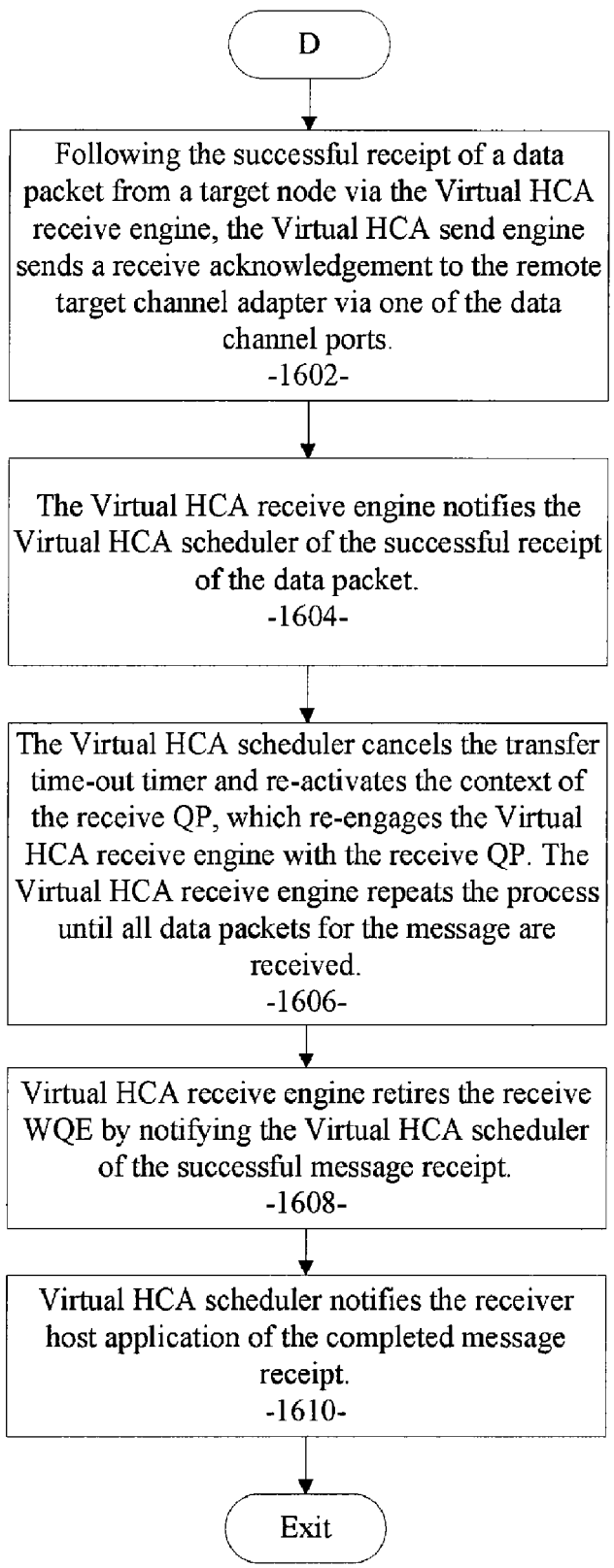

Referring to FIG. 16 at the bubble B, in processing block 1602, because the receipt of the data packet was successful, the virtual HCA send engine 517 sends a receive acknowledgement to the remote target channel adapter via one of the data channel ports. In processing block 1604, the virtual HCA receive engine 519 notifies the virtual HCA scheduler 507 of the successful receipt of the data packet. The virtual HCA scheduler 507 cancels the transfer timeout timer and re-activates the context of the receive QP, which re-engages the virtual HCA receive engine 519 with the receive QP (processing block 1606). The virtual HCA receive engine 519 repeats the process until all data packets for the message are received. The virtual HCA receive engine 519 retires the receive WQE by notifying the virtual HCA scheduler 507 of the successful message receipt (processing block 1608). Virtual HCA scheduler 507 notifies the receiver host application of the successful message receipt (processing block 1610). Virtual HCA engine 500 processing logic then terminates at the exit bubble shown in FIG. 16. In processing block 1506 illustrated in FIG. 15, because the data packet receipt was unsuccessful, virtual HCA receive engine 519 updates an error counter and processing continues at the bubble E illustrated in FIG. 13, where virtual HCA receive engine 519 reconfigures the message switch 505 to receive a data packet from the appropriate target node. The process continues until the data packet is successfully received or a maximum number of attempted receipts is exceeded.

Figure 17:
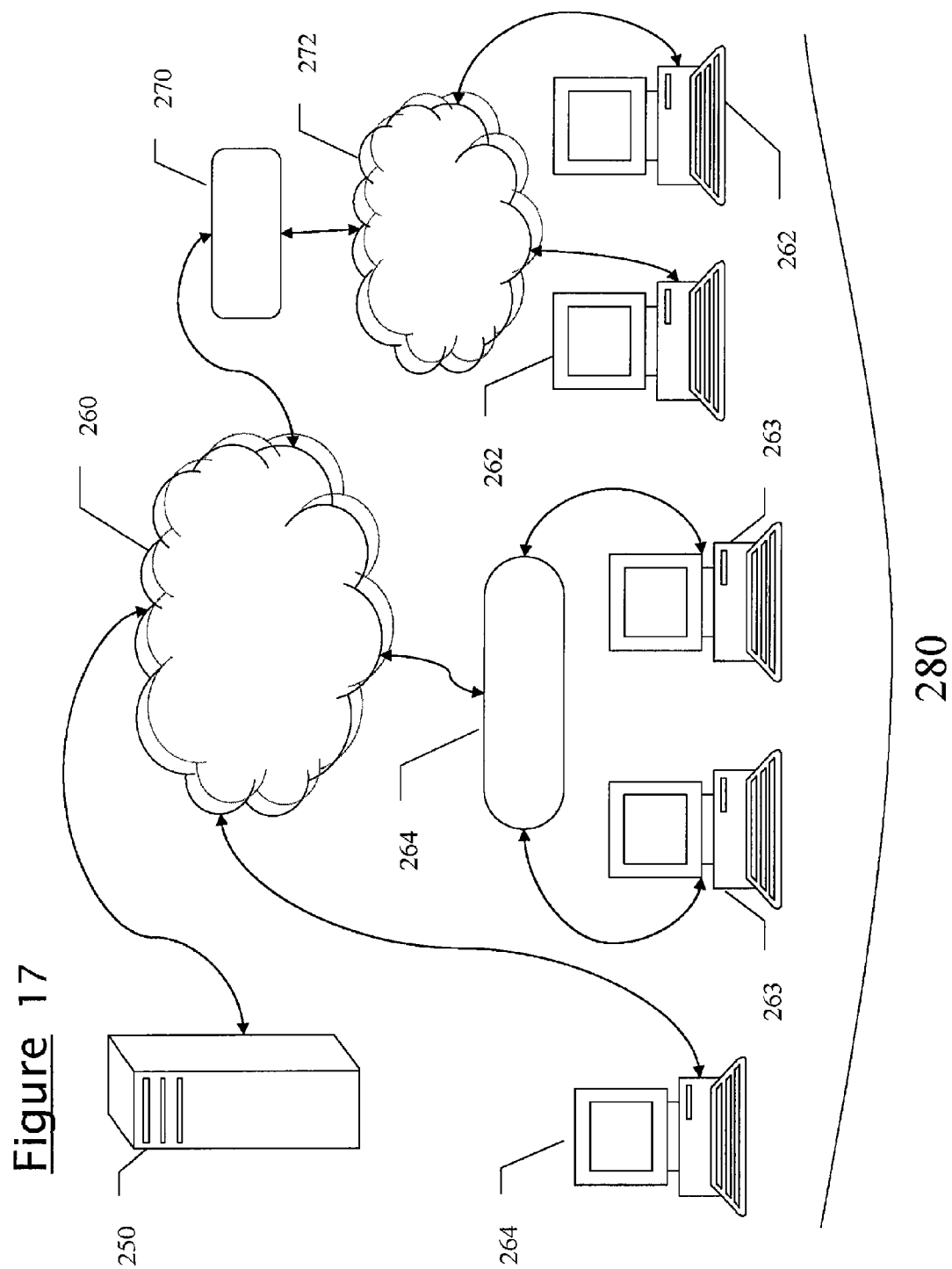
FIG. 17 illustrates a network environment in which an example embodiment may operate.

Referring to FIG. 17, a diagram illustrates the network environment in which an example embodiment may operate. In this conventional network architecture, a server computer system 250 is coupled to a wide-area network 260. Wide-area network 260 includes the Internet, or other proprietary networks, which are well known to those of ordinary skill in the art. Wide-area network 260 may include conventional network backbones, long-haul telephone lines, Internet service providers, various levels of network routers, and other conventional means for routing data between computers. Using conventional network protocols, server 250 may communicate through wide-area network 260 to a plurality of client computer systems 262, 263, and 264 connected through wide-area network 260 in various ways. For example, client 264 is connected directly to wide-area network 260 through direct or dial-up telephone or other network transmission line. Alternatively, clients 263 may be connected through wide-area network 260 using a modem pool 264. A conventional modem pool 264 allows a plurality of client systems to connect with a smaller set of modems in modem pool 264 for connection through wide-area network 260. In another alternative network topology, wide-area network 260 is connected to a gateway computer 270. Gateway computer 270 is used to route data to clients 262 through a subnet and local area network (LAN) 272. In this manner, clients 262 can communicate with each other through local area network 272 or with server 250 through gateway 270 and wide-area network 260.

Using one of a variety of network connection means, server computer 250 can communicate with client computers 280 using conventional means. In a particular implementation of this network configuration, a server computer 250 may operate as a web server if the Internet's World-Wide Web (WWW) is used for wide area network 260. Using the HTTP protocol and the HTML coding language across wide-area network 260, web server 250 may communicate across the World-Wide Web with clients 280. In this configuration, clients 280 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 280 may access image, graphical, and textual data provided by web server 250 or they may run Web application software. Conventional means exist by which clients 280 may supply information to web server 250 through the World Wide Web 260 and the web server 250 may return processed data to clients 280.

Figure 18:
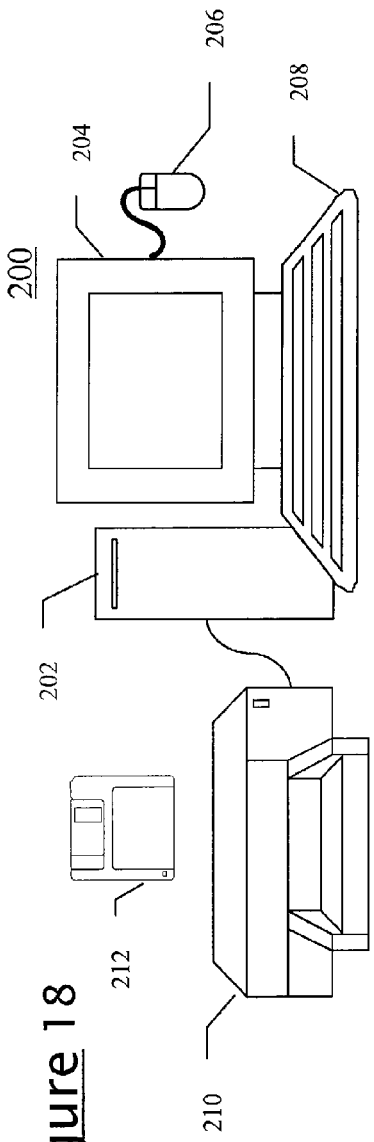
FIGS. 18 and 19 show an exemplary computer system in which the features of an example embodiment may be implemented.
Figure 19:
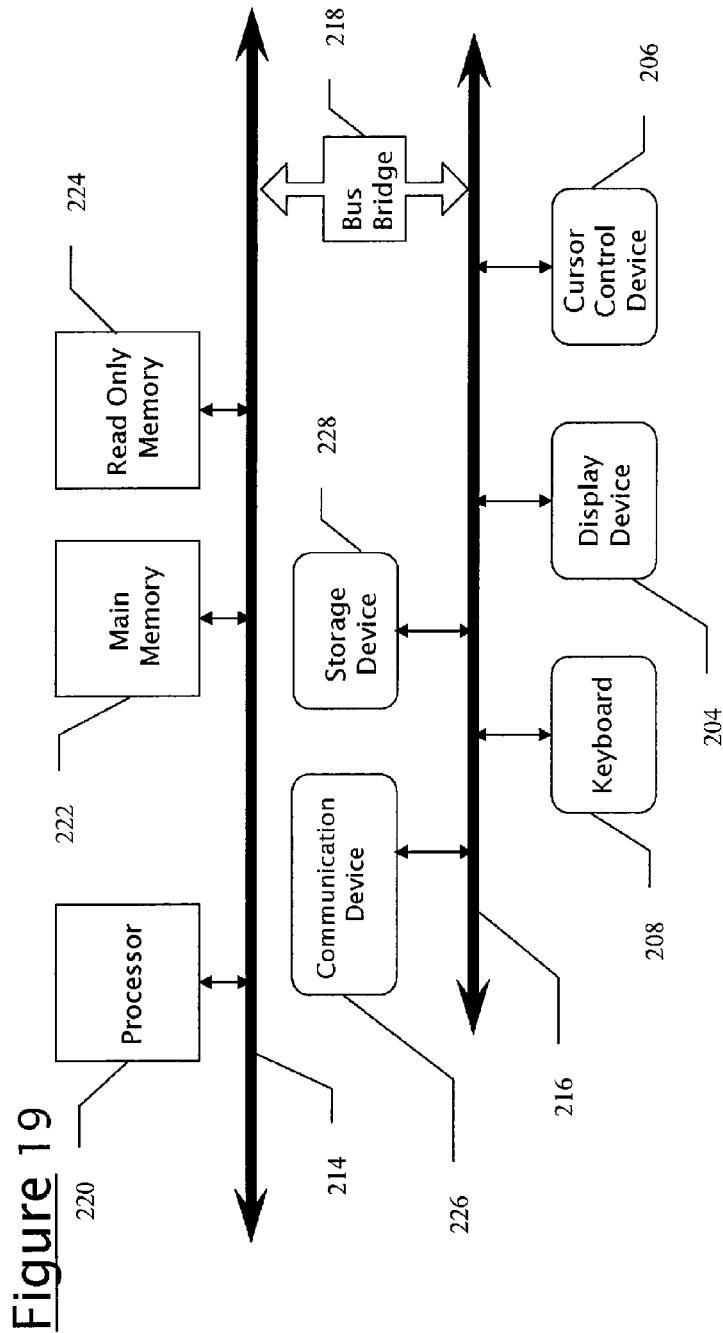

Having briefly described one embodiment of the network environment in which an example embodiment may operate, FIGS. 18 and 19 show an example of a computer system 200 illustrating an exemplary host, client 280, or server 250 computer system, in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 250, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 250 via a conventional network infrastructure such as the infrastructure illustrated and described above.

The system of an example embodiment includes software, information processing hardware, and various processing steps, which are described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of data structures may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

The software and/or data described herein may further be transmitted or received over a network 260 via the communication device 226 utilizing any one of a number of well-known transfer protocols, for example, the hyper text transfer protocol (HTTP). While the machine-readable medium 212 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a multiple context single logic virtual host channel adapter is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

I claim:

1. A method comprising:
   providing a plurality of input/output ports in a network switch, which provide a set of data channels for data communications between one of a plurality of host nodes and one of a plurality of target nodes;
   providing a plurality of virtual host channel adapters (HCA's) in the network switch, any one of which may be assigned to a work queue pair received via any one of the plurality of input/output ports;
   receiving a work queue pair via any one of the plurality of input/output ports;
   assigning the work queue pair to one of the plurality of virtual host channel adapters (HCA's);
   activating a scheduler in the network switch to sequence processing performed by the plurality of virtual host channel adapters (HCA's), the scheduler being accessible to the plurality of virtual host channel adapters (HCA's);
   updating a context associated with the work queue pair, the context being stored in a shared memory of the network switch accessible to the plurality of virtual host channel adapters (HCA's);
   creating at least one data packet corresponding to the work queue pair; and
   sending the at least one data packet to at least one of the plurality of target nodes via at least one of the plurality of input/output ports of the network switch.

2. The method as claimed in claim 1 wherein the context is associated with at least one of the plurality of virtual host channel adapters (HCA's).

3. The method as claimed in claim 1 further including adding the work queue pair to a virtual send engine queue.

4. The method as claimed in claim 1 further including requesting the scheduler to start a transfer timeout timer when the at least one data packet is sent.

5. The method as claimed in claim 1 further including receiving a send acknowledgement from one of the plurality of target nodes after the at least one data packet is sent.

6. A method comprising:
   providing a plurality of input/output ports in a network switch, which provide a set of data channels for data communications between one of a plurality of host nodes and one of a plurality of target nodes;
   providing a plurality of virtual host channel adapters (HCA's) in the network switch, any one of which may be assigned to a work queue pair received via any one of the plurality of input/output ports;
   receiving a work queue pair via any one of the plurality of input/output ports;
   assigning the work queue pair to one of the plurality of virtual host channel adapters (HCA's);
   activating a scheduler in the network switch to sequence processing performed by the plurality of virtual host channel adapters (HCA's), the scheduler being accessible to the plurality of virtual host channel adapters (HCA's);
   updating a context associated with the work queue pair, the context being stored in a shared memory of the network switch accessible to the plurality of virtual host channel adapters (HCA's); and
   receiving at least one data packet from at least one of the plurality of target nodes via at least one of the plurality of input/output ports of the network switch.

7. The method as claimed in claim 6 wherein the context is associated with at least one of the plurality of virtual host channel adapters (HCA's).

8. The method as claimed in claim 6 further including adding the work queue pair to a virtual receive engine queue.

9. The method as claimed in claim 6 further including obtaining a buffer area for receiving the at least one data packet.

10. The method as claimed in claim 6 further including sending a receive acknowledgement to one of the plurality of target nodes after the at least one data packet is received.

11. An apparatus comprising:
    means for providing a plurality of input/output ports in a network switch, which provide a set of data channels for data communications between one of a plurality of host nodes and one of a plurality of target nodes;
    means for providing a plurality of virtual host channel adapters (HCA's) in the network switch, any one of which may be assigned to a work queue pair received via any one of the plurality of input/output ports;
    means for receiving a work queue pair via any one of the plurality of input/output ports;
    means for assigning the work queue pair to one of the plurality of virtual host channel adapters (HCA's);
    means for activating a scheduler in the network switch to sequence processing performed by the plurality of virtual host channel adapters (HCA's), the scheduler being accessible to the plurality of virtual host channel adapters (HCA's);
    means for updating a context associated with the work queue pair, the context being stored in a shared memory of the network switch accessible to the plurality of virtual host channel adapters (HCA's);
    means for creating at least one data packet corresponding to the work queue pair; and
    means for sending the at least one data packet to at least one of the plurality of target nodes via at least one of the plurality of input/output ports of the network switch.

12. The apparatus as claimed in claim 11 wherein the context is associated with at least one of the plurality of virtual host channel adapters (HCA's).

13. The apparatus as claimed in claim 11 further including means for adding the work queue pair to a virtual send engine queue.

14. An apparatus comprising:
  means for providing a plurality of input/output ports in a network switch, which provide a set of data channels for data communications between one of a plurality of host nodes and one of a plurality of target nodes;
  means for providing a plurality of virtual host channel adapters (HCA's) in the network switch, any one of which may be assigned to a work queue pair received via any one of the plurality of input/output ports;
  means for receiving a work queue pair via any one of the plurality of input/output ports;
  means for assigning the work queue pair to one of the plurality of virtual host channel adapters (HCA's);
  means for activating a scheduler in the network switch to sequence processing performed by the plurality of virtual host channel adapters (HCA's), the scheduler being accessible to the plurality of virtual host channel adapters (HCA's);
  means for updating a context associated with the work queue pair, the context being stored in a shared memory of the network switch accessible to the plurality of virtual host channel adapters (HCA's); and
  means for receiving at least one data packet from at least one of the plurality of target nodes via at least one of the plurality of input/output ports of the network switch.

15. The apparatus as claimed in claim 14 wherein the context is associated with at least one of the plurality of virtual host channel adapters (HCA's).

16. The apparatus as claimed in claim 14 further including means for adding the work queue pair to a virtual receive engine queue.

17. A virtual host channel adapter (HCA) engine in a network switch, the virtual host channel adapter (HCA) engine comprising:
  a virtual host channel adapter (HCA) scheduler in the network switch to receive a work queue pair from at least one of a plurality of host nodes via one of a plurality of input/output ports of the network switch, to assign the work queue pair to one of a plurality of virtual host channel adapters (HCA's) in the network switch, and to sequence processing performed by the plurality of virtual host channel adapters (HCA's), the scheduler being accessible to the plurality of virtual host channel adapters (HCA's); and
  a virtual send engine in the network switch to update a context associated with the work queue pair, to create at least one data packet corresponding to the work queue pair;
  and to send the at least one data packet to at least one of a plurality of target nodes via at least one of the plurality of input/output ports of the network switch, the virtual send engine being accessible to the plurality of virtual host channel adapters (HCA's), the context being stored in a shared memory of the network switch accessible to the plurality of virtual host channel adapters (HCA's).

18. The virtual host channel adapter (HCA) engine as claimed in claim 17 wherein the context is associated with at least one of the plurality of virtual host channel adapters (HCA's).

19. The virtual host channel adapter (HCA) engine as claimed in claim 17 wherein the virtual send engine processes the work queue pair added to a virtual send engine queue.

20. The virtual host channel adapter (HCA) engine as claimed in claim 17 wherein the scheduler starts a transfer timeout timer when the at least one data packet is sent.

21. The virtual host channel adapter (HCA) engine as claimed in claim 17 further including a virtual receive engine to receive a send acknowledgement from one of the plurality of target nodes after the at least one data packet is sent, the virtual receive engine being accessible to the plurality of virtual host channel adapters (HCA's).

* * * * *